United States Patent
Korrapati et al.

(10) Patent No.: US 12,531,928 B2
(45) Date of Patent: Jan. 20, 2026

(54) SYSTEMS AND METHODS FOR DEVICE LOCATION REPORTING

(71) Applicant: Verizon Patent and Licensing Inc., Basking Ridge, NJ (US)

(72) Inventors: Sudhir Korrapati, Acton, MA (US); Carl Wang, Syosset, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 148 days.

(21) Appl. No.: 18/602,588

(22) Filed: Mar. 12, 2024

(65) Prior Publication Data

US 2025/0294031 A1  Sep. 18, 2025

(51) Int. Cl.
*H04L 67/52* (2022.01)
*G16Y 40/10* (2020.01)
*G16Y 40/60* (2020.01)
*H04L 67/12* (2022.01)

(52) U.S. Cl.
CPC .............. *H04L 67/12* (2013.01); *G16Y 40/10* (2020.01); *G16Y 40/60* (2020.01); *H04L 67/52* (2022.05)

(58) Field of Classification Search
CPC ....... H04L 63/12; H04L 63/107; H04L 67/12; H04L 67/52
See application file for complete search history.

(56) References Cited

U.S. PATENT DOCUMENTS

| | | | |
|---|---|---|---|
| 2015/0271639 A1* | 9/2015 | Ziskind ................. | H04W 4/021 455/456.1 |
| 2015/0365796 A1* | 12/2015 | Toni .................. | H04W 52/0251 455/456.1 |
| 2016/0212585 A1* | 7/2016 | DeCorte ............... | H04W 4/029 |
| 2024/0395419 A1* | 11/2024 | Jain ........................ | G16H 80/00 |

* cited by examiner

*Primary Examiner* — Jason D Recek

(57) ABSTRACT

In some implementations, a network device may receive an indication of a first device location at a first time instance and based on a first location source, wherein the first device location is a first location of a device associated with a target asset. The network device may receive, in response to a movement of the device, an indication of a second device location at a second time instance based on a second location source, wherein the second device location is a second location of the device. The network device may generate a time series location history for the device based on the first device location and the second device location. The network device may perform a verification of the target asset based on the time series location history.

20 Claims, 14 Drawing Sheets

SYSTEMS AND METHODS FOR DEVICE LOCATION REPORTING

BACKGROUND

Communication systems are widely deployed to provide various telecommunication services such as telephony, video, data, messaging, and broadcasts. A network may include one or more network nodes that support communication for wireless communication devices.

DETAILED DESCRIPTION OF EXAMPLE EMBODIMENTS

Figure 1:
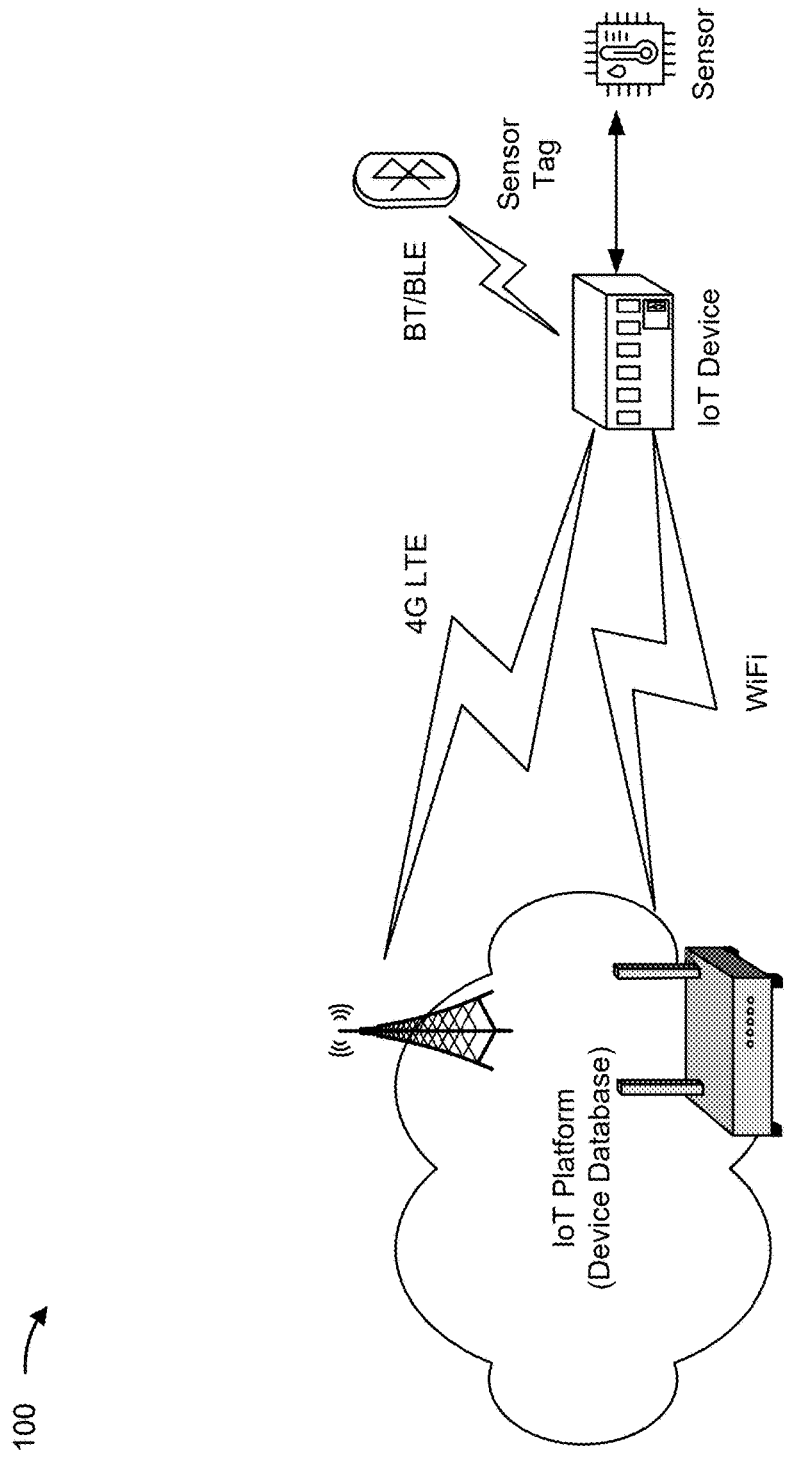
FIG. 1 is a diagram of an example associated with an Internet of Things (IoT) platform.

The following detailed description of example implementations refers to the accompanying drawings. The same reference numbers in different drawings may identify the same or similar elements.

An Internet of Things (IoT) platform may connect to an IoT device via a cellular network. The IoT platform may provide managed connections to a cloud computing system. The IoT platform may enable cloud connectivity for a relatively large quantity of battery powered IoT devices. An IoT device may communicate with sensors and/or sensor tags via a Bluetooth or Bluetooth low energy (BLE) connection. The IoT platform may be a collection of cloud services that enables IoT device management. The IoT devices that are connected to the IoT platform may be identified by a device identifier (ID).

An IoT device that relies solely on one available location service may not be able to provide a location of a tagged asset throughout a life cycle of asset tracking, especially for a mixed indoor/outdoor tracking use case. For example, an asset in a factory may need to be tracked indoors in a building and outdoors when traveling to a warehouse, and then at the warehouse. While this situation may be resolved by an overlay of different location service technologies for different physical environment (e.g., one location service technology to cover an indoor environment and another location service technology to cover an outdoor environment), such an approach may require redundant hardware and added software complexity to integrate location data from different location services over two potentially independent location systems that produce wasted resources/cost. The IoT device may be required to have redundant hardware and/or software complexity, which may reduce the operational battery life of the IoT device and/or increase the overall cost of the IoT device/system.

In some implementations, a device, such as an IoT device, may utilize common hardware, such as a BLE tag. An IoT platform may provide an integrated location service operating under the common hardware to provide continuous location tracking per asset with automated location service management in the IoT platform, which may reduce redundant resource usage. The IoT platform may provide the integrated location service that supports multiple location service technologies operating on the common hardware, which may be especially useful for mixed indoor-outdoor use cases.

In some implementations, a network device associated with the IoT platform may receive an indication of a first device location at a first time instance and based on a first location source, where the first device location may be a first location of a device associated with a target asset. For example, the first device location at the first time instance may be based on the first location source being a static BLE gateway. The network device may receive, in response to a movement of the device, an indication of a second device location at a second time instance based on a second location source, where the second device location may be a second location of the device. A geofence alarm may be triggered to set up location measurements associated with the second location source based on the movement of the device. For example, the second device location at the second time instance may be based on the second location source being a mobile BLE gateway location. The device may not be statically paired to the first location source or the second location source, and the device may be enabled to physically transition between coverage of supported location technologies. The network device may perform, for one or more of the first device location or the second device location, a device location confidence check based on a delta between device locations in a same evaluation period or based on a delta to a last updated device location. The network device may generate a time series location history for the device (e.g., on a per device basis) based on the first device location and the second device location, where the time series location history may be generated for a mixed indoor-outdoor tracking of the device. The network device may filter the time series location history to remove duplicate device location data associated with different location sources. The network device may perform a verification of the target asset based on the time series location history. For example, the network device may verify that the target asset successfully left an indoor location (e.g., a factory) based on the time series location history. In some implementations, the network node may coordinate a location technology selection when obtaining the device location, which may enable the device to use common hardware, as opposed to employing separate hardware for each location technology.

FIG. 1 is a diagram of an example 100 associated with an IoT platform.

As shown in FIG. 1, the IoT platform may connect to an IoT device via a cellular network. The cellular network may be associated with narrowband IoT, category M1 (Cat-M1), Fourth Generation (4G) Long Term Evolution (LTE), or Fifth Generation (5G) ultra-wideband. The cellular network may allow for low power wireless device connectivity. The IoT platform may provide managed connections to a cloud computing system. The IoT platform may enable cloud connectivity for a relatively large quantity of battery powered IoT devices. An IoT device may communicate with sensors and/or sensor tags via a Bluetooth or BLE connection.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Device location technologies for IoT devices may include global navigation satellite system (GNSS) (e.g., a satellite based navigation technology known as global position system (GPS) with a few alternatives operated by different countries, such as Galileo (European Union), GLONASS (Russia), and BeiDou (China)), cellular (e.g., Third Generation Partnership Project (3GPP) standard defined cellular location technology for devices equipped with a cellular modem), WiFi (e.g., triangulation of known WiFi access point (AP) location), BLE (e.g., a coarse type based on proximity to a known reference location (beacon) or a precise type based on triangulation using a reference BLE with a known location), and/or mixed variations (e.g., assisted GPS or proximity to reference location). Each device location technology may vary in terms of accuracy, coverage, and/or cost.

An IoT platform may be a collection of cloud services that enables IoT device management. The IoT devices that are connected to the IoT platform may be identified by a device ID. The device ID may be managed by the IoT platform, such that the IoT platform is able to assist in performing or connecting to added cloud support services for the IoT device. The IoT platform may provide device configuration and management for cellular connectivity, device data (environmental sensor measurement), as well as GPS location and other device assisted location related measurement reporting. The device data may be channeled through the IoT platform and may be forwarded to a data processing center for further processing.

Figure 2:
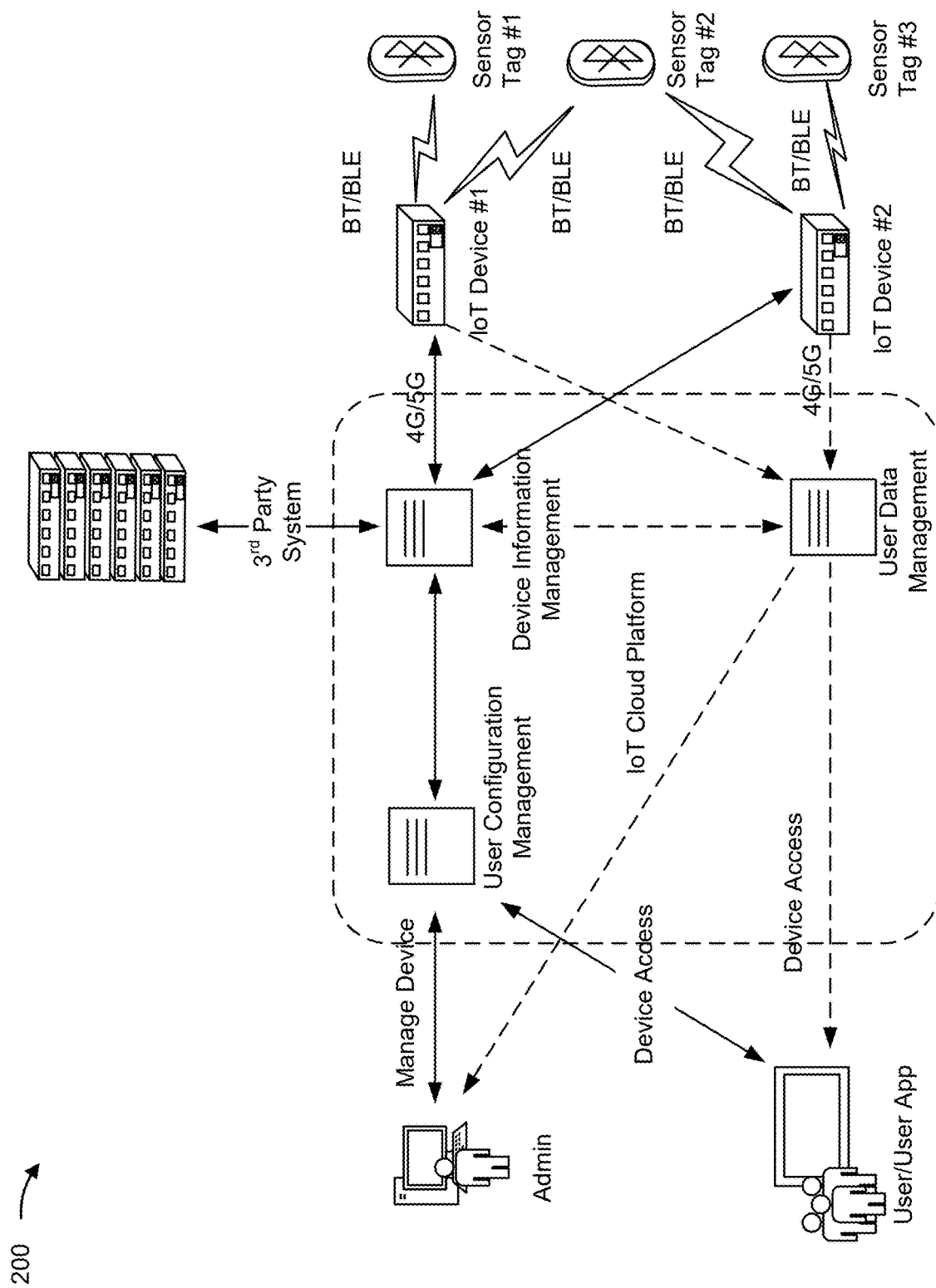
FIG. 2 is a diagram of an example associated with a reference IoT device cloud management service architecture.

FIG. 2 is a diagram of an example 200 associated with a reference IoT device cloud management service architecture.

As shown in FIG. 2, an IoT cloud platform may include a user configuration management system, a device information management system, and a user data management system. IoT devices that are managed by the IoT platform may connected to the device information management system and/or the user data management system. IoT devices may connect to one or more sensor tags via Bluetooth or BLE. An administrator, a user, and/or a user application may communicate with the user configuration management system, the device information management system, and/or the user data management system, respectively.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
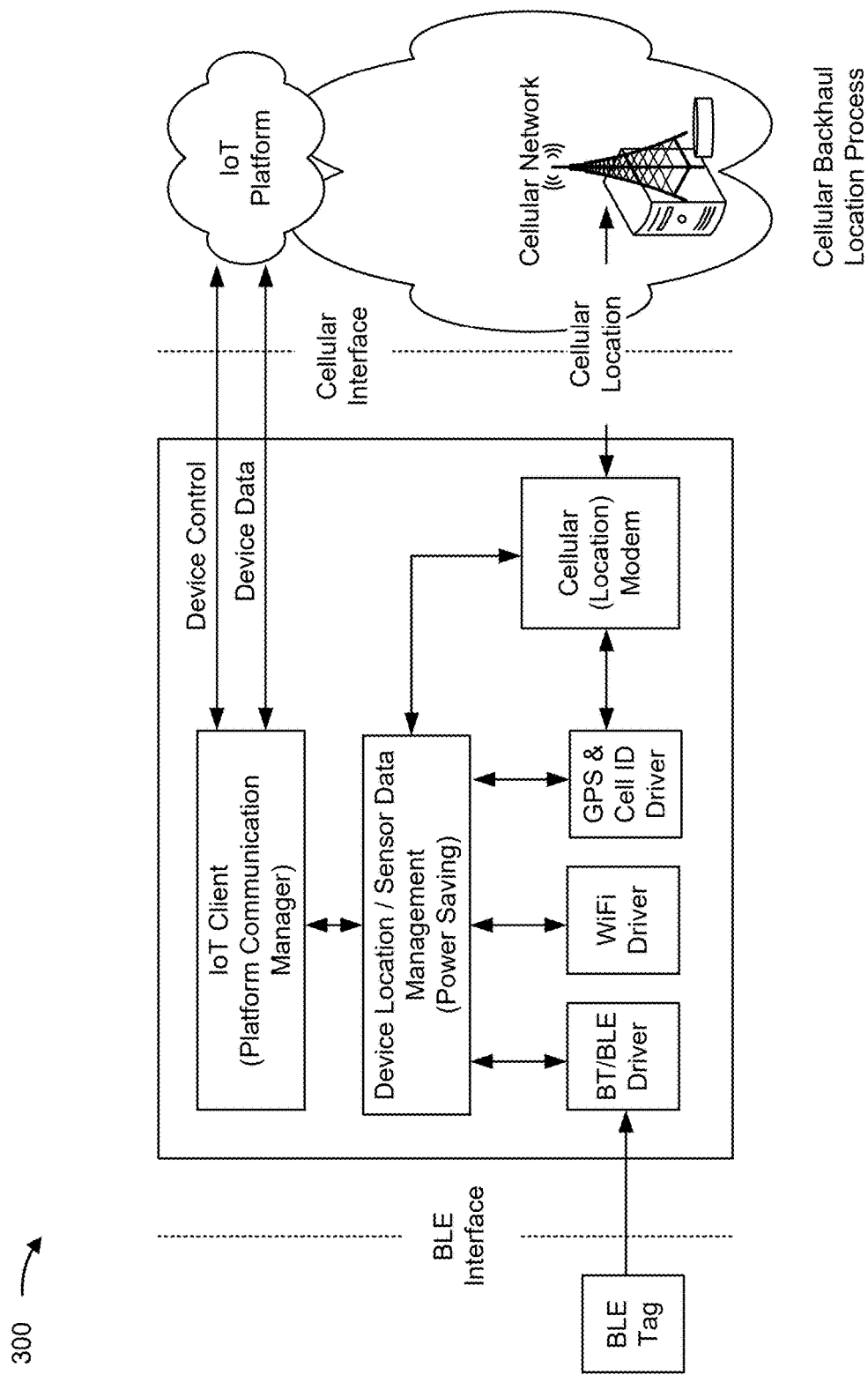
FIG. 3 is a diagram of an example associated with a reference IoT Bluetooth Low Energy (BLE) gateway device architecture.

FIG. 3 is a diagram of an example 300 associated with a reference IoT BLE gateway device architecture.

As shown in FIG. 3, an IoT BLE gateway device may communicate with a BLE tag via a BLE interface. The IoT BLE gateway device may communicate with an IoT platform via a cellular interface. The IoT platform may be associated with a cellular network. The IoT BLE gateway device may include an IoT platform client (platform communication manager), device location and sensor data management (power saving). The IoT platform client may convey device control data and/or device data to the IoT platform. The device location and sensor data management may communicate with a Bluetooth/BLE driver, a WiFi driver, a GPS and cell ID driver, and/or a cellular (location) modem.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

An IoT device that relies solely on one of the available location services may not be able to provide a location of a tagged asset throughout a life cycle of asset tracking, especially for a mixed indoor/outdoor tracking use case. While this situation may be resolved by an overlay of different location service technologies for different physical environment (e.g., one location service technology to cover an indoor environment and another location service technology to cover an outdoor environment, such an approach may require redundant hardware and added software complexity to integrate location data from different location services over two potentially independent location systems that produce wasted resources/cost.

In some implementations, device location may be provided via a coordinated location technology selection, which may be based on a cloud platform automated situational location data selection. An integrated location services solution may operate under common hardware (e.g., BLE tag) to provide continuous location tracking per asset with automated location service management in an IoT platform to reduce redundant resource usage/cost. In an IoT asset management platform, an ability to provide an integrated location service that supports multiple location service technologies operating on common hardware (e.g., BLE tags) may offer a tailored end-to-end IoT solution for individual use cases. Further, a cellular network usage may be extended into isolated/indoor (e.g., BLE) network applications.

In some implementations, unified (optimized) location reporting may be employed to target a device (e.g., a BLE tag). Platform coordinated device location technology reporting control may be used to reduce resource usage (e.g., over-the-air (OTA) data, or device battery consumption by suspending a redundant location technology). A real time indoor infrastructure BLE location solution (e.g., platform detection/determination) may reduce/eliminate an IoT device reporting rate for a non-real time solution. Multi-location technology reporting coordination on a device may be employed to reduce resource usage (e.g., OTA data, or device battery consumption). A disabling/enabling of individual GPS, WiFi, cellular coarse location or other location solution, such as a reference infrastructure BLE signal measurement, may be employed at the device (e.g., automatic or remote commanded).

In some implementations, the IoT platform may tag data per device to ensure correct data forwarding to an intended end user. The IoT platform may monitor for individual device location reports from different location technologies and apply rules to filter duplicate data to provide a single time series device location report stream with a user selectable preference (rule), as well as assigning a confidence level to the reported location. The IoT platform may have device configuration information, and in addition to consolidating device location report, the IoT platform may automatically suspend duplicate location reporting information from the device to optimize/extend a device operational life or throttle a location data generation rate per technology to reduce resource usage (e.g., OTA location report).

Figure 4:
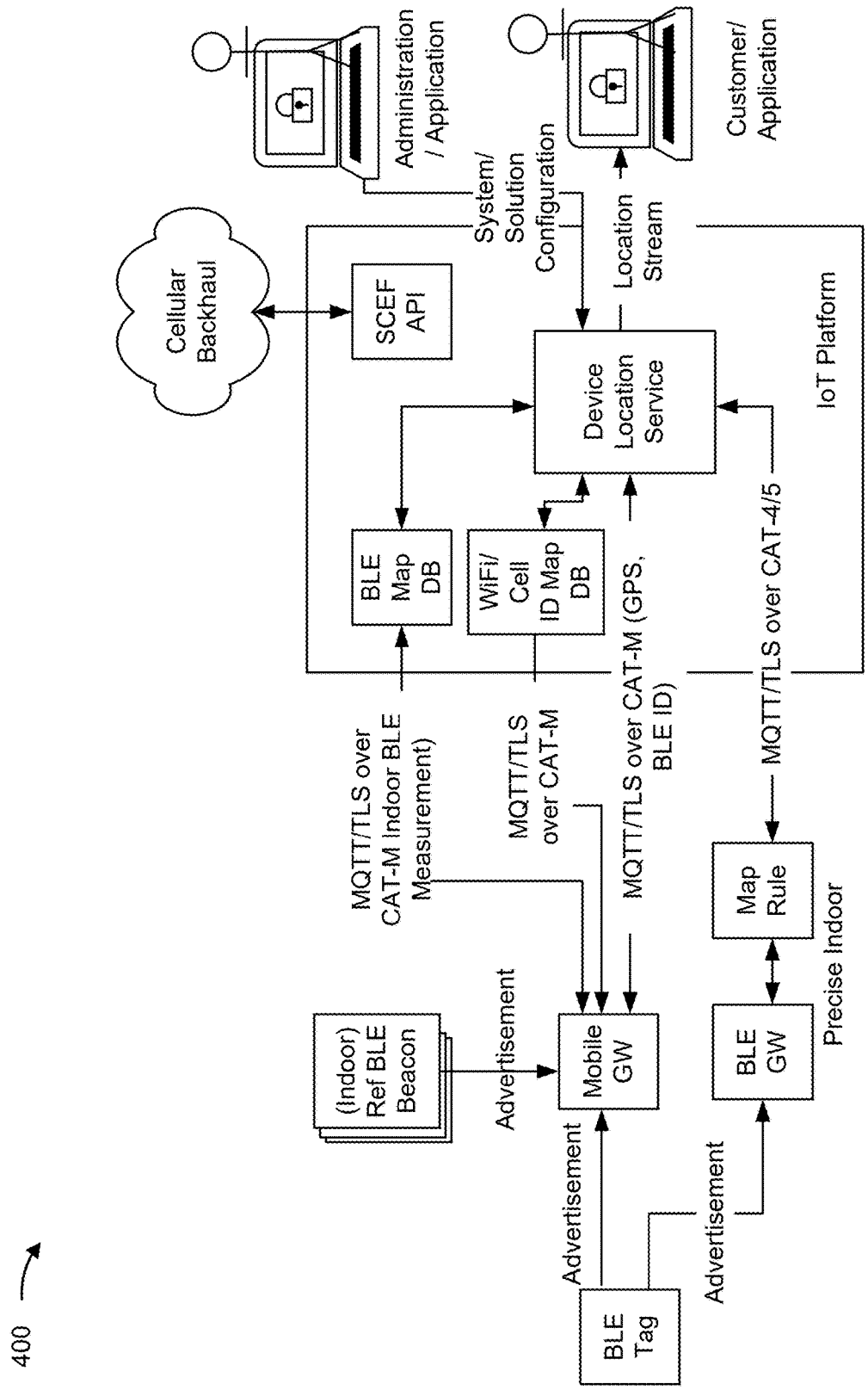
FIG. 4 is a diagram of an example associated with a unified location service architecture.

FIG. 4 is a diagram of an example 400 associated with a unified location service architecture.

As shown in FIG. 4, a coordinated device location service system may require that data generation from a source location technology provides a data generation time stamp, which may include a third party location technology that inject a semi/real time location report into an IoT platform. The system may include various types of devices, such as a mobile BLE tag (or beacon), a mobile BLE gateway, a static BLE beacon, and/or a static BLE gateway.

In some implementations, static BLE beacon and gateways may be references for location determination, and may be part of a location technology infrastructure with a known location. The mobile BLE tag may be a primary device that is used as a location determination tag for a user asset. The mobile BLE gateway may be a secondary device that is required to generate a target location depending on a utilized location technology and may be a main target for device resource usage optimization. When the mobile BLE gateway supports an operational mode as the mobile BLE tag, the mobile gateway BLE gateway may be considered to be an BLE asset tracking tag. The mobile BLE gateway may be assigned to track an asset.

In some implementations, a BLE device location may be generated directly in some technology solution, for example, an infrastructure BLE gateway with high computational power may implement a location generation/determination engine to generate a location of a received BLE tag device. The mobile BLE gateway, typically with less computation power and battery constraint, may generate indirectly the location of the BLE tag received in conjunction with the location of the receiving BLE gateway device. Alternatively, the determination of the BLE tag location may be performed at an IoT platform by processing location measurements received at the mobile BLE gateway itself in addition to the BLE tag. The mobile BLE gateway may determine its own location directly (e.g., using a GPS of the mobile BLE gateway) or by using the IoT platform via GPS, WiFi, referencing static reference BLE infrastructure, and/or cellular. The various location technology services data may be consolidated at a device location service entity in the IoT platform to provide a time sequenced BLE device location stream (history) for the user. The mobile BLE tag may not be statically paired to any mobile or static BLE gateway, which may enable the mobile BLE tag to physically transition between (overlap or non-overlapping) coverage of supported location technologies while an end user/application is receiving continuous location reports. Signals from the mobile BLE gateway and the static BLE gateway may be securely transmitted using message queuing telemetry transport (MQTT) protocol over transport layer security (TLS) or using any other appropriate messaging protocol.

Figure 5:
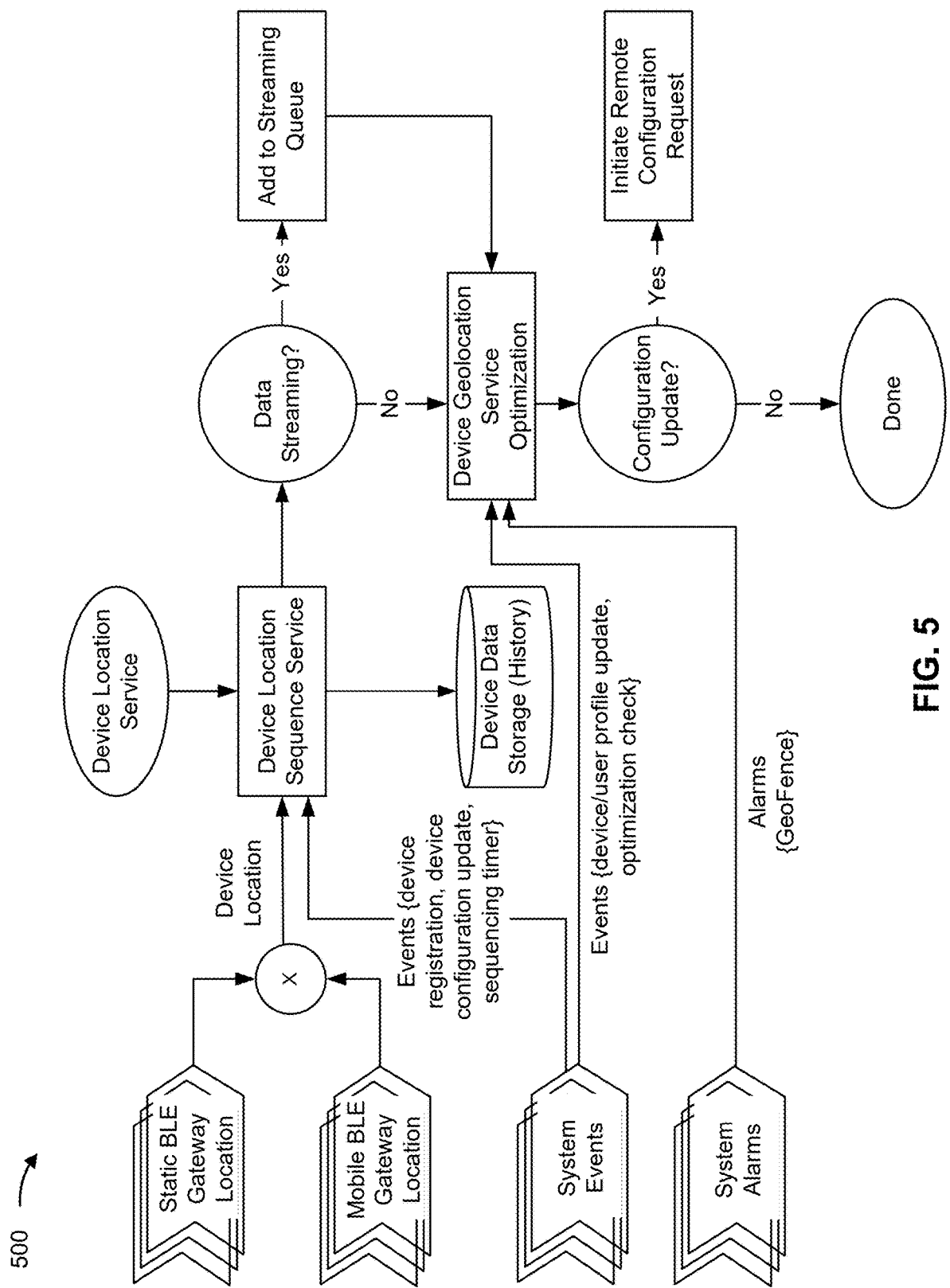
FIG. 5 is a diagram of an example associated with a device location service.

As indicated above, FIG. 4 is provided as an example. Other examples may differ from what is described with regard to FIG. 4. The number and arrangement of devices shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) shown in FIG. 4 may perform one or more functions described as being performed by another set of devices shown in FIG. 4. FIG. 5 is a diagram of an example 500 associated with a device location service.

In some implementations, the device location service may receive location reports, device service registration, and/or related alarm/events to consolidate and time sequence a device location into a time series location history per device. The device location may be associated with a longitude, a latitude, and/or an elevation of the device. When the mobile BLE tag is physically in a region where overlapping location technologies have overlapping coverage, the device location service may fetch a device configuration from a user configuration management entity and determine when system usage may be optimized from suspending a less reliable location technology data collection. For this purpose, the device location service may fetch the device configuration at or before a reception of a location data stream from multiple location technologies. The device location service may involve various operations, such as device location sequencing and device geolocation service optimization (DGSO).

As shown in FIG. 5, the device location service may include a device location sequence service that obtains device location information. The device location information may be associated with a static BLE gateway location report, a mobile BLE gateway location report, and/or system events. The device location information may be stored in a device data storage (history). A live location data report service may be configured by an end user, in which case a semi-real-time consolidated device location output from the device location sequence service may be sent to a streaming service to enable live location data. In other words, the semi-real-time consolidated device location output may be possible based on the live location data report service being configured. A device geolocation and/or service optimization may be performed. When a configuration update is needed, a remote configuration request may be initiated.

As indicated above, FIG. 5 is provided as an example. Other examples may differ from what is described with regard to FIG. 5. The number and arrangement of devices shown in FIG. 5 are provided as an example. In practice, there may be additional devices, fewer devices, different devices, or differently arranged devices than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) shown in FIG. 5 may perform one or more functions described as being performed by another set of devices shown in FIG. 5.

Figure 6:
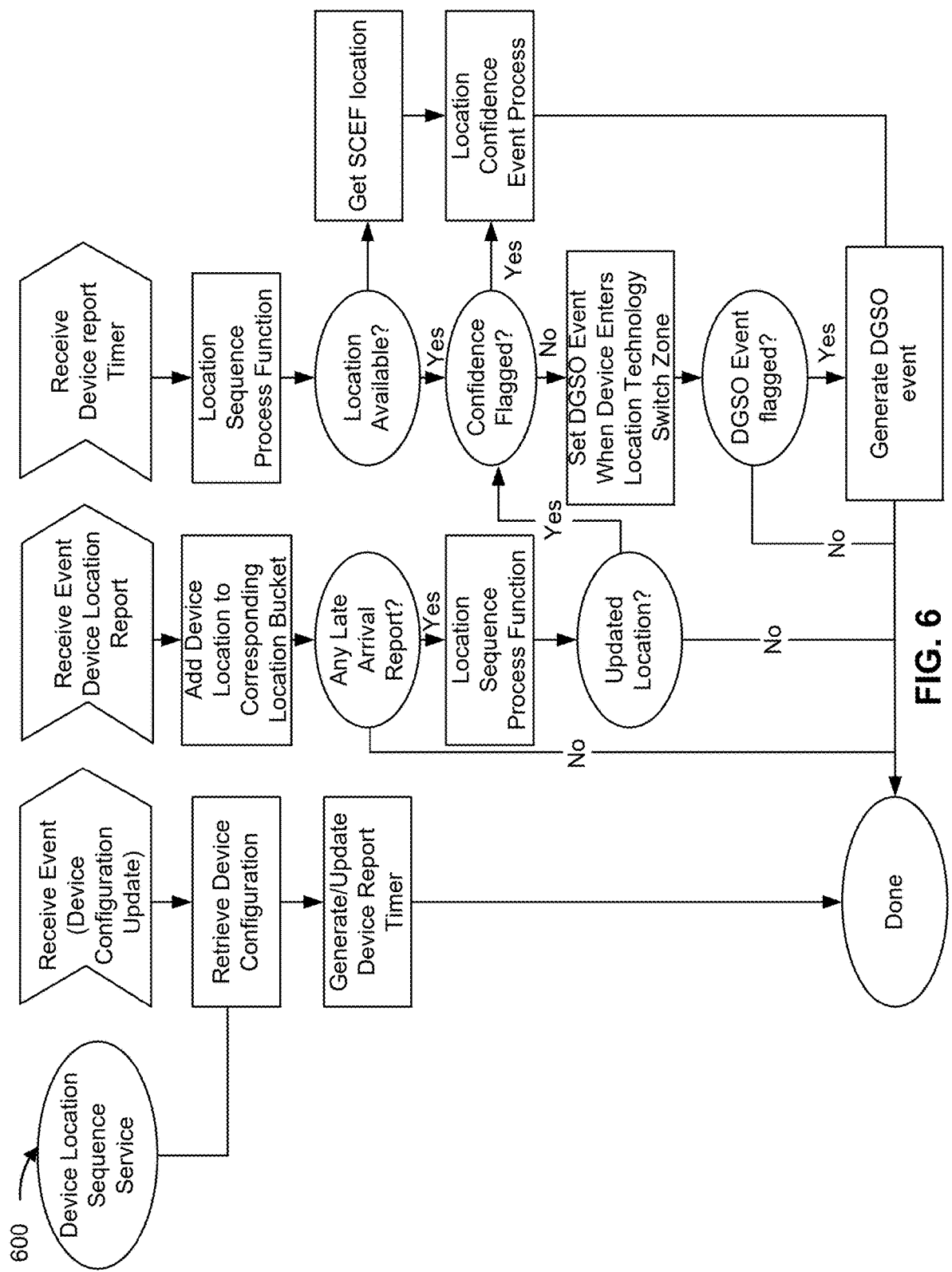
FIG. 6 is a diagram of an example associated with a device location sequencing service.

FIG. 6 is a diagram of an example 600 associated with a device location sequencing service.

In some implementations, the device location sequencing service may be an active add on service entity that monitors all device location data received for a device. The device location sequencing service may combine and sequence location data into one single time series per device. The device location sequencing service may monitor for multiple location data source streams and request a device geolocation optimization service to evaluate/select which location technology to use as the primary location information and determine when a different technology is to be activated to provide the primary location information for a device. The device location sequencing service may flag when a significant delta is present in device location reported from different location sources (in the same evaluation period) or from a last updated location to perform a location confidence check. Location sample buckets may be preserved for a maximum location update window, which may enable an update of a device location determination using a delayed delivery (after a semi-real-time location report determination) of new location data to improve an accuracy of a location determination history. The location determination history may indicate a list of historical locations associated with the device. The customer may choose how to obtain this location update on a past virtual time line tailoring to the customer usage of location data. One example is that the updated past location is not delivered on a semi-real time streaming service but fetched only from an IoT platform database on a user application historical data request.

As shown in FIG. 6, the device location sequence service may receive an indication of an event (e.g., new device configuration update from the user). The device location sequence service may establish a new or retrieve an existing device configuration to update upon reception of the relevant configuration update event. The device location sequence service may generate or update a deice report timer event according to the update device configuration. The device location sequence service may receive a device location report. The device location sequence service may add a device location to a corresponding location bucket (storage data buffer). The device location sequence service may receive a deice report timer event to start location sequence process function for the location data in the location bucket. When a location is not available, the device location sequence service may obtain last known location from a service capabilities exposure function (SCEF) location service or another type of location service for devices that support cellular location service. When the device location sequence service receives a late arrival report, the device location sequence service may determine whether a past determined location is updated. When the location is updated and a confidence is flagged, a location confidence event process may be performed. When the location is updated and a confidence is not flagged, the device location sequence service may set a device geolocation service optimization event to check if the device enters a location technology switch zone. When the device geolocation service optimization event is flagged, a device geolocation service optimization event may be generated.

As indicated above, FIG. 6 is provided as an example. Other examples may differ from what is described with regard to FIG. 6. The number and arrangement of devices shown in FIG. 6 are provided as an example. In practice, there may be additional devices, fewer devices, different devices, or differently arranged devices than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) shown in FIG. 6 may perform one or more functions described as being performed by another set of devices shown in FIG. 6.

Figure 7:
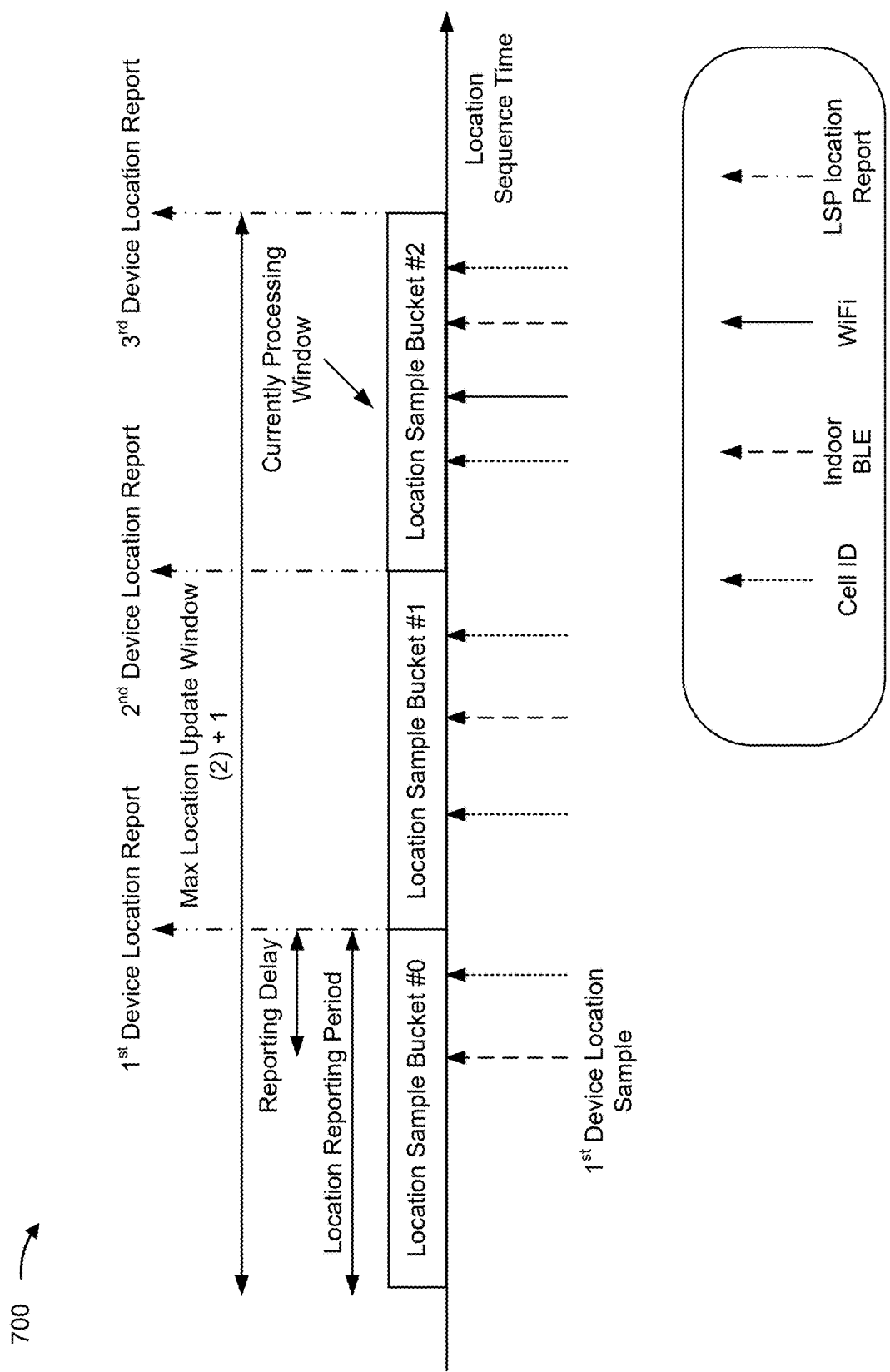
FIG. 7 is a diagram of an example associated with a location sequence processing time frame.

FIG. 7 is a diagram of an example 700 associated with a location sequence processing time frame.

As shown in FIG. 7, a location sequencing process may be an active time-sensitive event function that operates on a per device location data sample collection buffer (location bucket) to provide a periodic consolidated semi-real-time location. Each location sample may be tagged with additional information. The additional information may include a device ID. The additional information may include a gateway device ID, which may indicate an ID of a gateway that forwarded the location data of the target device. The additional information may include a source location technology that generated a location sample point (e.g., GPS, WiFi, cell ID, or BLE proximity). The additional information may provide an accuracy, which indicate a range of location points estimated by the source technology. The additional information may include a generation time, which may be a timestamp that marks when the location is measured/generated by the source technology.

In some implementations, for each new device registered/activated/configuration updated on an IoT platform, the location sequencing process may collect various types of information. The information may include the device ID. The information may include a location reporting type. The location sequencing process may operate on a periodic data reporting type. The information may include a location reporting period, which may be associated with a periodic location data update rate. When the device (e.g., a BLE tag) does not have a reporting period, the reporting period of a reporting gateway may be used. The information may include a reporting delay (optional default), which may be associated with a location determination delay introduced by the location sequencing process (e.g., due to buffering for processing). The information may include a maximum location update window (optional default), which may be associated with a time window that the location sequencing process determined/reported a location in a history storage (location bucket) is allowed to be updated by a new arrival of delivery delayed location measurement data. A location sequencing process function may sequence a location data stream on a per reporting device basis. Each reporting device may be allocated one or more location sample collection buckets/buffers based on a configured maximum location update window size and a generation time of an arrived location sample.

As indicated above, FIG. 7 is provided as an example. Other examples may differ from what is described with regard to FIG. 7. The number and arrangement of devices shown in FIG. 7 are provided as an example. In practice, there may be additional devices, fewer devices, different devices, or differently arranged devices than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) shown in FIG. 7 may perform one or more functions described as being performed by another set of devices shown in FIG. 7.

Figure 8:
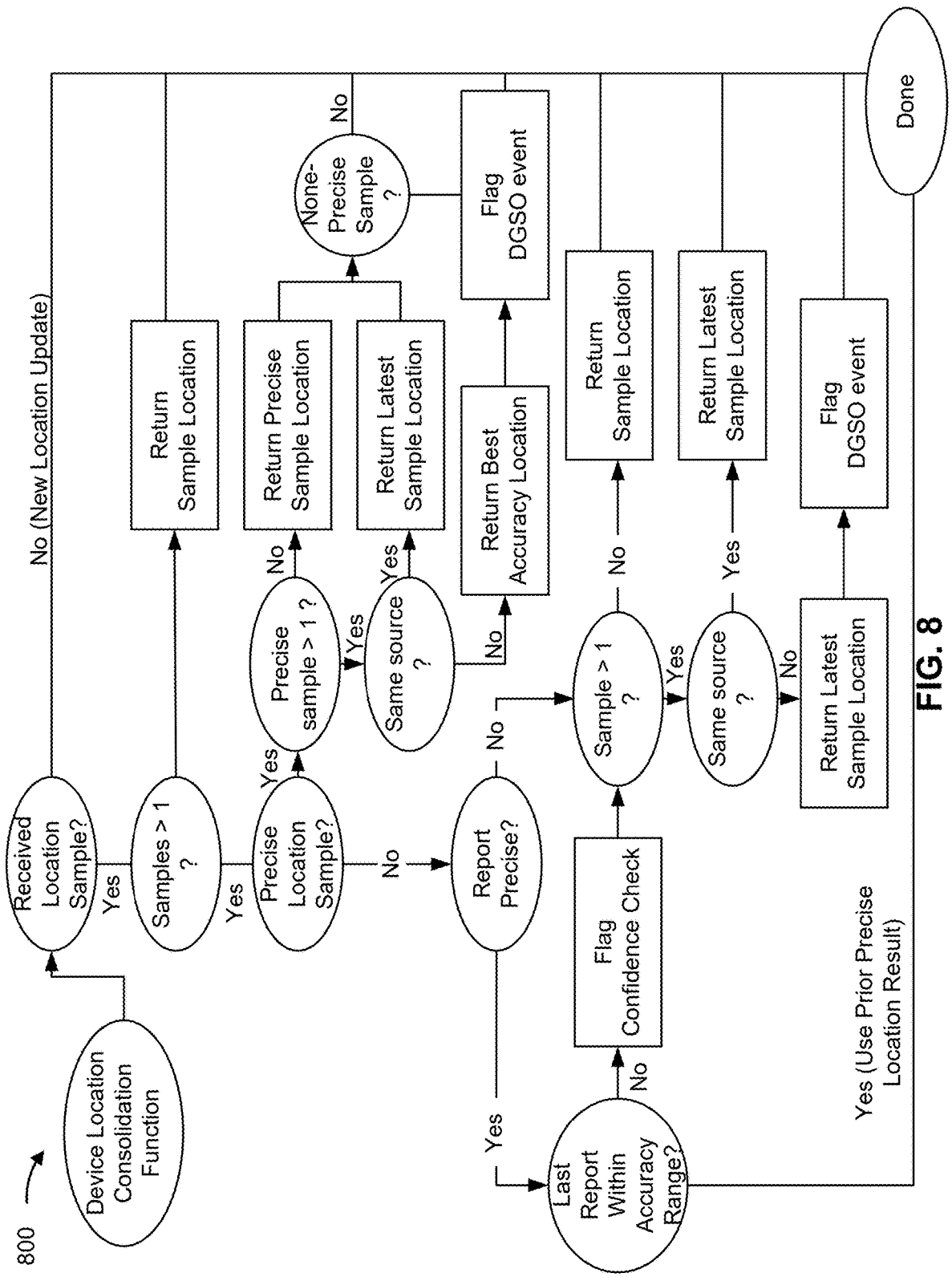
FIG. 8 is a diagram of an example associated with a location samples consolidation function.

FIG. 8 is a diagram of an example 800 associated with a location samples consolidation function.

In some implementations, each location sample (generated by different location technology sources) received may be placed into a location sample bucket corresponding to a sample generation time. A location sequencing process function may maintain a semi-real time location reporting of the service by processing all location samples available in a location sample bucket in real time to determine the device location to be reported per user configuration. The location samples consolidation function may be used to process the location samples in a location sample bucket. A precise location technology may refer to a technology that provides a device location report at a pre-determined accuracy (D), for example, D may be set to 1 meter. The location sample buckets may be preserved for a maximum location update window, which may enable an update of device location determination using delayed delivery (after semi-real time location report determination) of new location data to improve the accuracy of the location determination on the virtual time line.

As shown in FIG. 8, a location samples consolidation function may receive a location sample. Depending on whether the location sample is precise, a precise sample location may be returned, a latest sample location may be returned, or a best accuracy location may be returned. When the location sample is not precise, a determination of whether a last report is precise may be made and/or whether the last report is within an accuracy range. Depending on the last report, the prior sample location may be returned, a latest sample location may be returned, or the best accuracy location may be returned. In some cases, the location samples consolidation function may flag a device geolocation service optimization event.

As indicated above, FIG. 8 is provided as an example. Other examples may differ from what is described with regard to FIG. 8. The number and arrangement of devices shown in FIG. 8 are provided as an example. In practice, there may be additional devices, fewer devices, different devices, or differently arranged devices than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) shown in FIG. 8 may perform one or more functions described as being performed by another set of devices shown in FIG. 8.

Figure 9:
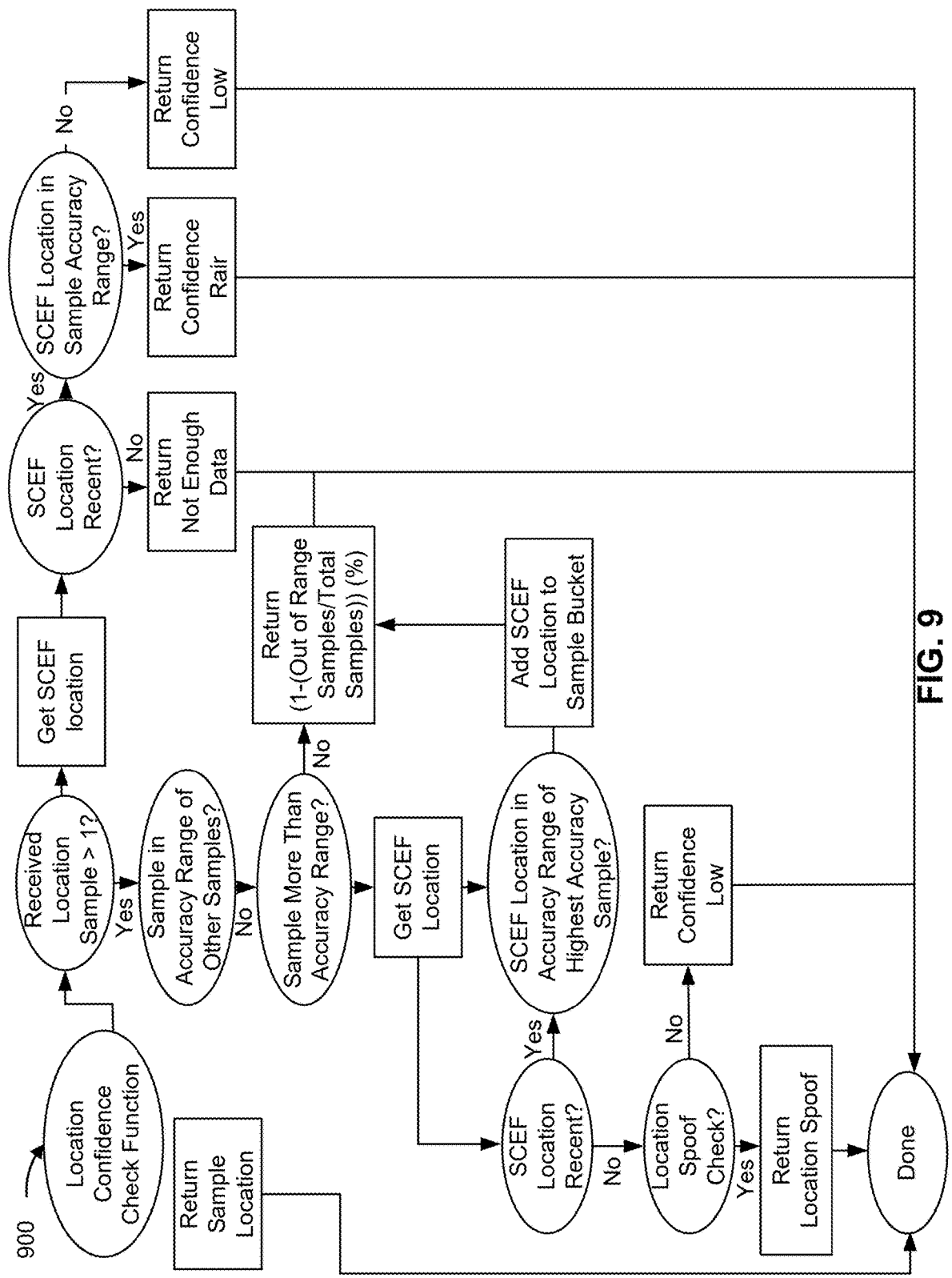
FIG. 9 is a diagram of an example associated with a location confidence check process.

FIG. 9 is a diagram of an example 900 associated with a location confidence check process.

In some implementations, the location confidence check process may involve comparing location sample reports from multiple location technologies and requesting a device location from a cellular network for a specific device (e.g., via an SCEF application programming interface (API)) as needed to determine a confidence on an accuracy of a reported device location. The location confidence check process may utilize a location spoof detection service at a detection of a significant change in device location to provide a validation on authenticity of a reported device location.

As shown in FIG. 9, a location confidence check function may determine whether a location sample is received. When the location sample is not received, an SCEF location may be obtained. When the SCEF location is recent and the SCEF location is in a sample accuracy range, a fair confidence may be returned, and otherwise, a low confidence may be returned. When the location sample is received, and when each sample is in an accuracy range of other samples, a high confidence may be returned. When each sample is not in the accuracy range of other samples, the SCEF location may be obtained. When the SCEF location is recent, and when an SCEF location is in an accuracy range of a highest accuracy sample, the SCEF location may be added to a sample bucket. When the SCEF location is not recent, depending on a location spoof check, a low confidence may be returned or a location spoof may be returned.

As indicated above, FIG. 9 is provided as an example. Other examples may differ from what is described with regard to FIG. 9. The number and arrangement of devices shown in FIG. 9 are provided as an example. In practice, there may be additional devices, fewer devices, different devices, or differently arranged devices than those shown in FIG. 9. Furthermore, two or more devices shown in FIG. 9 may be implemented within a single device, or a single device shown in FIG. 9 may be implemented as multiple, distributed devices. Additionally, or alternatively, a set of devices (e.g., one or more devices) shown in FIG. 9 may perform one or more functions described as being performed by another set of devices shown in FIG. 9.

Figure 10:
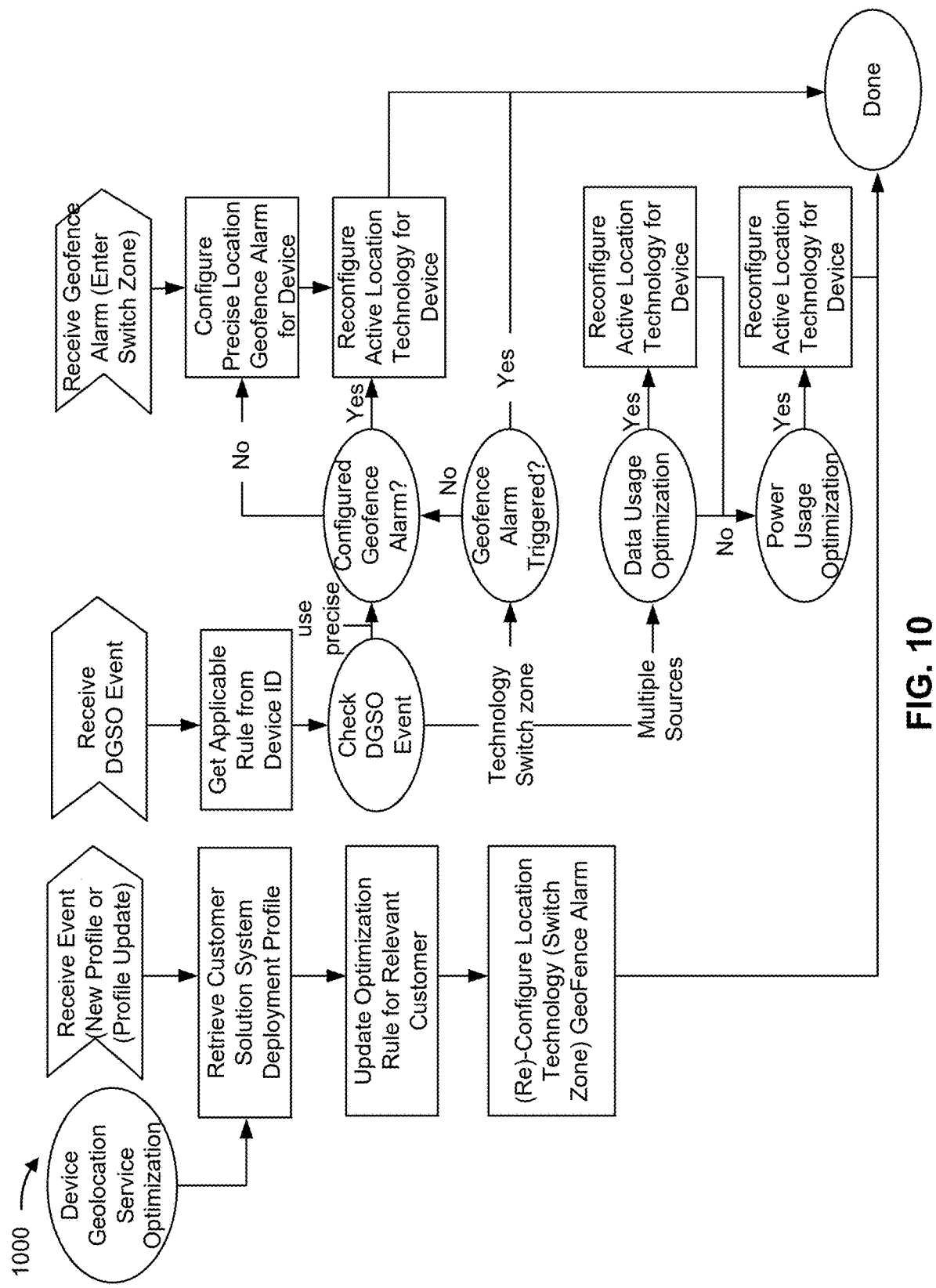
FIG. 10 is a diagram of an example associated with a device geolocation service optimization process flow.

FIG. 10 is a diagram of an example 1000 associated with a device geolocation service optimization process flow.

In some implementations, a device geolocation service optimization function may be a background passive service acting on event triggers to evaluate system performance optimization opportunities. The device geolocation service optimization function may fetch user setup configuration to determine the list of enabled location technologies and the system configuration setting with user preference profile. This system information is used in conjunction with the device's semi-real time location to select an applicable location technology optimization. Depending on a user configuration/profile, the device geolocation service optimization function may enable/select a location technology data stream for a specific BLE tag or mobile BLE gateway, and/or the device geolocation service optimization function may reference a customer/system service setup for a detection rule (automatic) update (e.g., a setup corresponding to event alarms).

As shown in FIG. 10, as part of a device geolocation service optimization, the device geolocation service optimization function may receive an indication of an event (e.g., profile update). The device geolocation service optimization function may retrieve a user solution system deployment profile, update an optimization rule for a relevant user, and/or configure (or reconfigure) a location technology (switch zone) geofence alarm. The device geolocation service optimization function may receive an indication of an event, obtain an applicable rule from a device ID, and then check the event. Depending on whether a geofence alarm is configured, a precise location geofence alarm for a device may be configured or an active location technology for the device may be reconfigured. Depending on a data usage optimization and/or a power usage optimization, the active location technology for the device may be reconfigured. The device geolocation service optimization function may receive an indication of the geofence alarm, configure the precise location geofence alarm for the device, and then reconfigure the active location technology for the device.

As indicated above, FIG. 10 is provided as an example. Other examples may differ from what is described with regard to FIG. 10. The number and arrangement of devices shown in FIG. 10 are provided as an example. In practice, there may be additional devices, fewer devices, different devices, or differently arranged devices than those shown in FIG. 10. Furthermore, two or more devices shown in FIG. 10 may be implemented within a single device, or a single device shown in FIG. 10 may be implemented as multiple, distributed devices. Additionally, or alternatively, a set of devices (e.g., one or more devices) shown in FIG. 10 may perform one or more functions described as being performed by another set of devices shown in FIG. 10.

Figure 11:
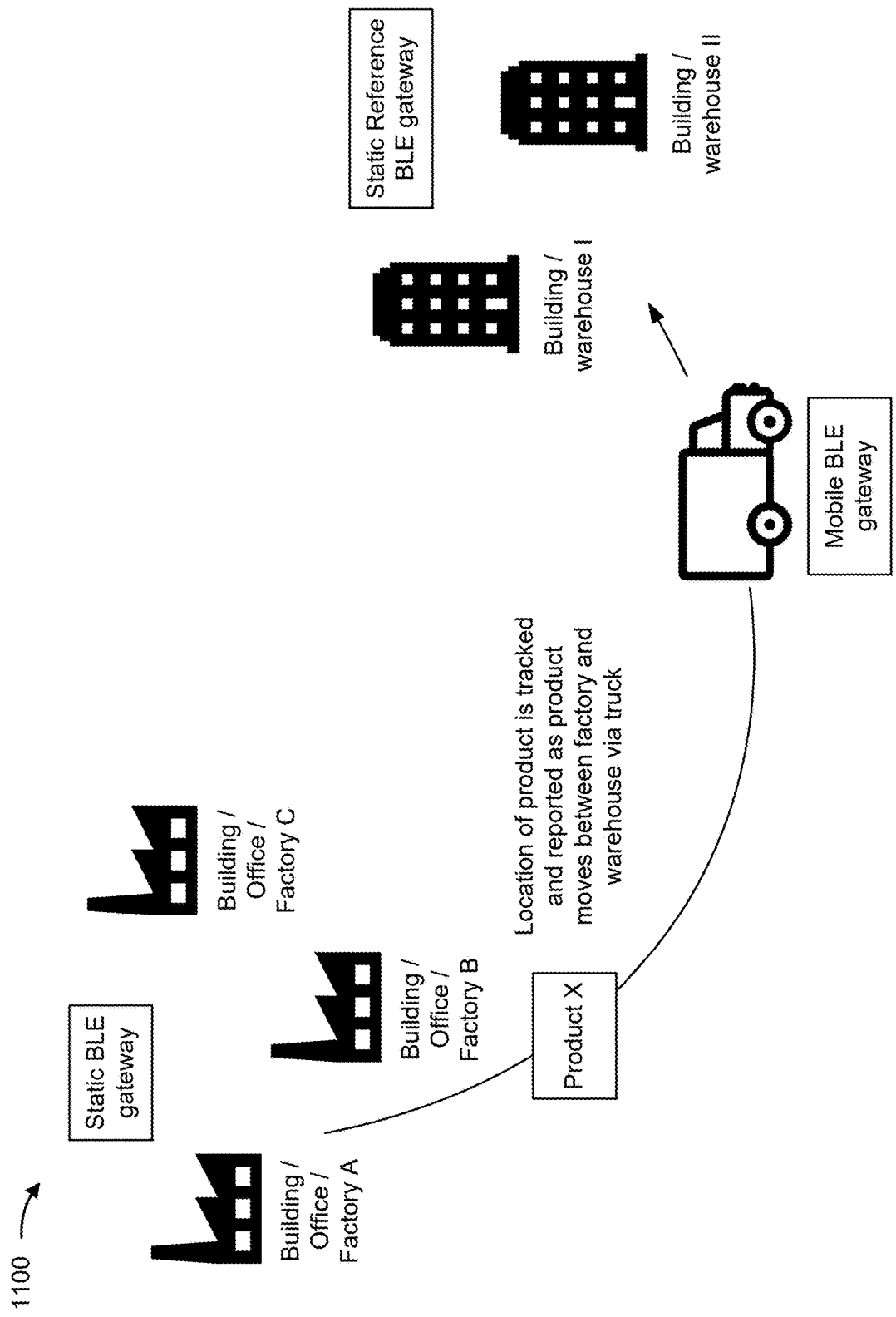
FIG. 11 is a diagram of an example of a use case associated with device location reporting.

FIG. 11 is a diagram of an example 1100 of a use case associated with device location reporting.

As shown in FIG. 11, as an application example, a company may operate in three company buildings/office/factory (A, B, C) that are installed with a static BLE gateway for a precise real-time BLE location service to track valuable asset movement and location. The company may also operate in two company buildings/warehouse (I, II) that are installed with a static reference BLE and a compatible mobile BLE gateway is installed on a moving vehicle (e.g., hand push cart or forklift) for asset location tracking. An open shipment redistribution yard/hub may have a mobile BLE gateway installed on a moving vehicle (e.g., trucks) and in key distribution points for asset location tracking.

In a first use case, a BLE tag #1 may be virtually assigned to a valuable product X for tracking purposes. An employee may produce product X in factory building A. Product X may be moved to the warehouse I by a push cart and may be left on a storage rack. The next day, product X may be picked up by a push cart to a shipment hub and placed on a truck for delivery. Product X may be delivered at the end of the day.

In the first use case, the BLE tag #1 may be virtually associated with product X with a production line entry user interface (UI) in building A. On the association, the product X location in building A may be automatically picked up by an indoor real-time BLE location infrastructure (via a static BLE gateway) and starts tracking a data/location history. A push cart may pick up product X. While in Building A, a product X location may be provided by the static BLE gateway (primary location source) with an event BLE tag detected by the mobile BLE gateway (push cart) for an association of Product X to the push cart. The location reporting for the product X via mobile gateway on the push cart may be disabled while in building A. The mobile gateway on the push cart may be configured to provide a BLE beacon to enable usage of building A indoor real-time location service (RTLS) to track the precise cart location in building A. A geofence alarm for building A may be setup on the push cart. As the push cart leaves building A into warehouse I, the geofence alarm may be triggered to enable the IoT platform to set up the mobile BLE gateway on the push cart to start static BLE beacon measurement for precise measurement of a location for the push cart in building I. This configuration also initiating a product X location reporting source to switch to the mobile BLE gateway on the push cart. This enable continues reporting of product X location as product X travels between different location technology deployment region seamlessly. Data collection (location update) for product X may stop at a storage rack when push cart rolls away.

A product X location may start an update again when associated with a new mobile BLE gateway (push cart) at pickup. As the push cart leaves the warehouse, a geofence alarm may be triggered which causes a switching of a push cart location service from a reference static BLE beacon to an outdoor GPS. The product X location source may be switched again to the mobile BLE gateway installed on the truck as product X is loaded for delivery. A truck driver may sign off a product X delivery, and a last location update of product X from the mobile BLE gateway (truck) may stop at a delivery site.

In a second use case, a mobile BLE gateway A may be virtually assigned to a shipping container. BLE tags #1~12 may be virtually assigned to 12 pallets that each carry a stack of assets that are loaded into a shipping container. A production line may produce product Y, which may be packaged onto pallets #1~3 in factory building B. Pellets #1~3 may be moved to the warehouse II by a forklift and may be left in a warehouse II storage area. A production line may produce product Z, which may be packaged onto pallets #4~12 in factory building C. Pellets #4~12 may be moved to the warehouse II by a forklift and may be left in a storage area. A shipping container may arrive at a shipping yard and wait to load the pallets for delivery. A forklift may be used to move all 12 pallets from the warehouse II to the shipping container in the shipment yard. The shipping container may be taken for delivery to three customer locations. The shipping container may be validated at a first location, and pallet 1 and 4-6 may be delivered. At a second location, pallet 7-10 may be delivered. At a third location, pallet 2-3 and 11-12 may be unloaded.

In the second use case, product Y may be produced in building B and packaged per pallet #1~3 and each assigned a BLE tag. The product Y location may be picked up by an indoor RTLS on association to BLE tag for track and trace. A forklift may move into building B and pick up pallet #1~3. While in Building B, pallet locations may be provided by the indoor RTLS with event BLE tags (pallet #1~3) detected by a mobile BLE gateway (forklift) which triggers an association of pallets to the forklift. A geofence alarm for building B may be set up on the forklift, and the forklift may be configured to provide a BLE tag signal to use the indoor RTLS with all other device location technologies suspended while in building B. As the forklift leaves building B into warehouse II, the geofence alarm may be triggered to start an infrastructure reference BLE measurement collection for the forklift, and initiate a product Y location source to switch to the mobile BLE gateway on the forklift. The data collection for product Y may stop at the warehouse II storage rack when the forklift drops the pallet and moves away.

In the second use case, product Z may be produced in building C and packaged per pallet #4~12 and each assigned a BLE tag. The product Z location may be picked up by an indoor RTLS on association to BLE tag for track and trace. A forklift may move into building C and pick up pallet #4~12. While in Building C, pallet locations may be provided by the indoor RTLS with event BLE tags (pallet #4~12) detected by a mobile BLE gateway (forklift) which triggers an association of pallet to the forklift. A geofence alarm for building C may be set up on the forklift, and the forklift may be configured to provide a BLE tag signal to use the indoor RTLS with all other device location technologies suspended while in building C. As the forklift laves building B into warehouse II, the geofence alarm may be triggered to start an infrastructure reference BLE measurement collection on the forklift, and initiate a product Z location source to switch to the mobile BLE gateway on the forklift. The data collection for product Z may stop at the warehouse II storage rack when the forklift drops the pallet and moves away.

In the second use case, the shipping container with a location source configured for GPS may arrive at the shipping yard. A forklift with a geofence alarm setup for warehouse II and reference BLE measurement may be used to pick up pellet #1~12 in warehouse II. The pallets may be associated with the forklift at a storage pickup on a BLE tag measurement reception. As the forklift leaves warehouse II into the shipping yard, the geofence alarm may be triggered to start a GPS/cell ID location detection on the forklift and suspend a reference BLE measurement. Pallets may be reassociated with the shipping container as the forklift drops the load and leaves. The shipping container may leave for the delivery to three customer sites. At a first customer site, pallet 1 and 4-6 locations may stop updating. A driver may validate a pallets delivery. At a second customer site, pallet 7-10 locations may stop updating. A driver may validate a pallets delivery. At a third customer site, pallet 2-3 and 11-12 locations may stop updating. As a driver validates a pallets delivery, a product life cycle tracking may be archived for auditing history.

In one example, an indoor facility (e.g., a warehouse or a factory floor) may include a static reference BLE gateway. An outdoor facility (e.g., a shipping area) may be connected via GPS, where the outdoor facility may be adjacent to the indoor facility. An employee may produce product Z at the indoor facility. The product Z may be moved to the outdoor facility. As product Z moves from the indoor facility to the outdoor facility, a real-time location of product Z may be tracked. The tracking may involve switching between location technologies (e.g., BLE based positioning to GPS) as product Z passes through these different zones, thereby allowing tracking data/location history to be obtained for product Z.

As indicated above, FIG. 11 is provided as an example. Other examples may differ from what is described with regard to FIG. 11. The number and arrangement of devices shown in FIG. 11 are provided as an example. In practice, there may be additional devices, fewer devices, different devices, or differently arranged devices than those shown in FIG. 11. Furthermore, two or more devices shown in FIG. 11 may be implemented within a single device, or a single device shown in FIG. 11 may be implemented as multiple, distributed devices. Additionally, or alternatively, a set of devices (e.g., one or more devices) shown in FIG. 11 may perform one or more functions described as being performed by another set of devices shown in FIG. 11.

Figure 12:
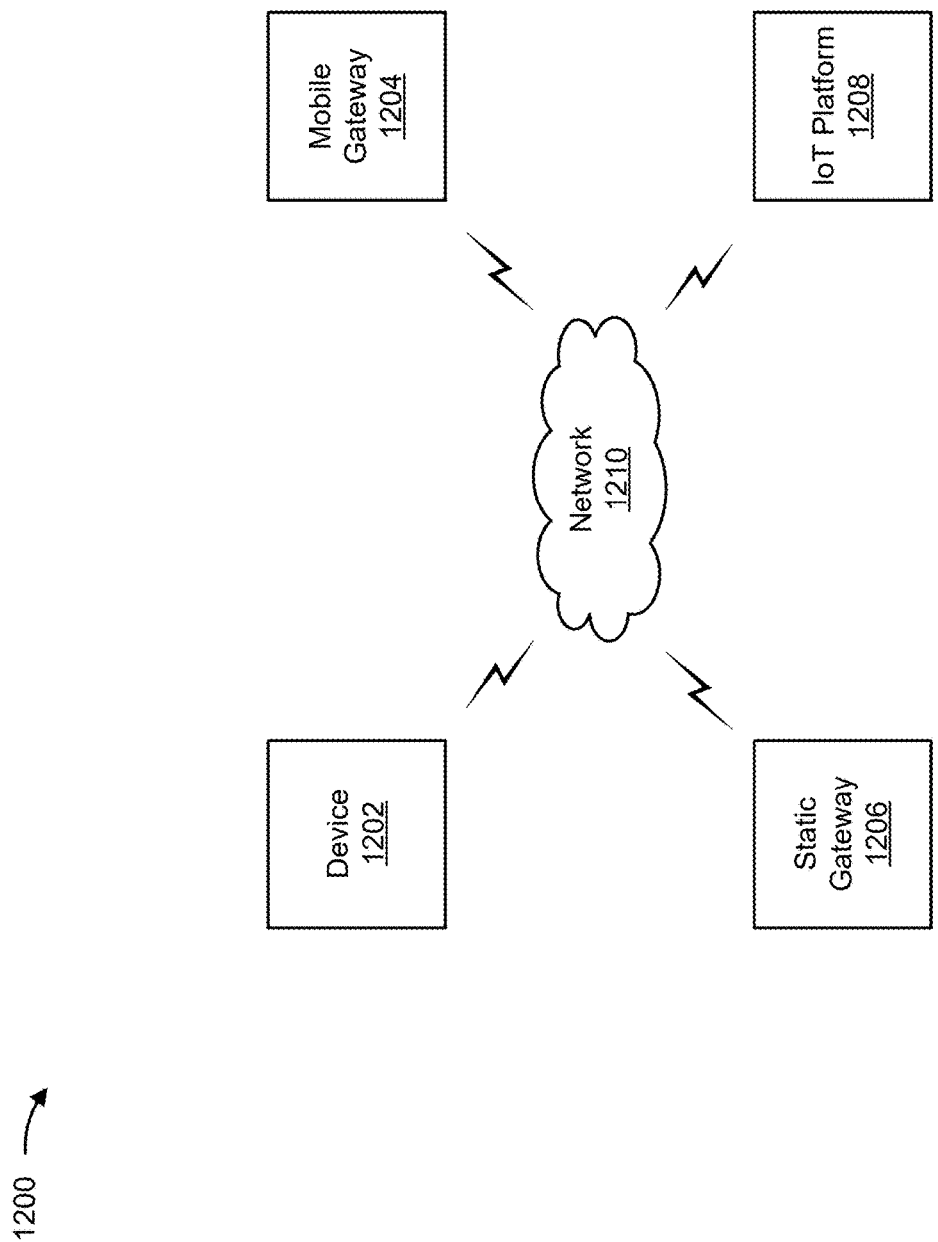
FIG. 12 is a diagram of an example environment in which systems and/or methods described herein may be implemented.

FIG. 12 is a diagram of an example environment 1200 in which systems and/or methods described herein may be implemented. As shown in FIG. 12, environment 1200 may include a device 1202 (e.g., an IoT device, such as a BLE tag), a mobile gateway 1204, a static gateway 1206, an IoT platform 1208, and a network 1210. Devices of environment 1200 may interconnect via wired connections, wireless connections, or a combination of wired and wireless connections.

The device 1202 may include one or more devices capable of receiving, generating, storing, processing, and/or providing information associated with device location reporting, as described elsewhere herein. The device 1202 may include a communication device and/or a computing device. For example, the device 1202 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), a smart television, an IoT device, or a similar type of device.

The mobile gateway 1204 may include one or more devices capable of receiving, generating, storing, processing, and/or providing information associated with device location reporting, as described elsewhere herein. The device 1202 may include a communication device and/or a computing device.

The static gateway 1206 may include one or more devices capable of receiving, generating, storing, processing, and/or providing information associated with device location reporting, as described elsewhere herein. The static gateway 1206 may include a communication device and/or a computing device.

The IoT platform 1208 may include one or more devices capable of receiving, generating, storing, processing, providing, and/or routing information associated with device location reporting, as described elsewhere herein. The IoT platform 1208 may include a communication device and/or a computing device. For example, the IoT platform 1208 may include a server, such as an application server, a client server, a web server, a database server, a host server, a proxy server, a virtual server (e.g., executing on computing hardware), or a server in a cloud computing system. In some implementations, the IoT platform 1208 may include computing hardware used in a cloud computing environment.

The network 1210 may include one or more wired and/or wireless networks. For example, the network 1210 may include a cellular network (e.g., a 5G network, a 4G network, an LTE network, a third generation (3G) network, a code division multiple access (CDMA) network, etc.), a public land mobile network (PLMN), a personal area network (PAN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 1210 enables communication among the devices of environment 1200.

The number and arrangement of devices and networks shown in FIG. 12 are provided as an example. In practice, there may be additional devices and/or networks, fewer devices and/or networks, different devices and/or networks, or differently arranged devices and/or networks than those shown in FIG. 12. Furthermore, two or more devices shown in FIG. 12 may be implemented within a single device, or a single device shown in FIG. 12 may be implemented as multiple, distributed devices. Additionally, or alternatively, a set of devices (e.g., one or more devices) of environment 1200 may perform one or more functions described as being performed by another set of devices of environment 1200.

Figure 13:
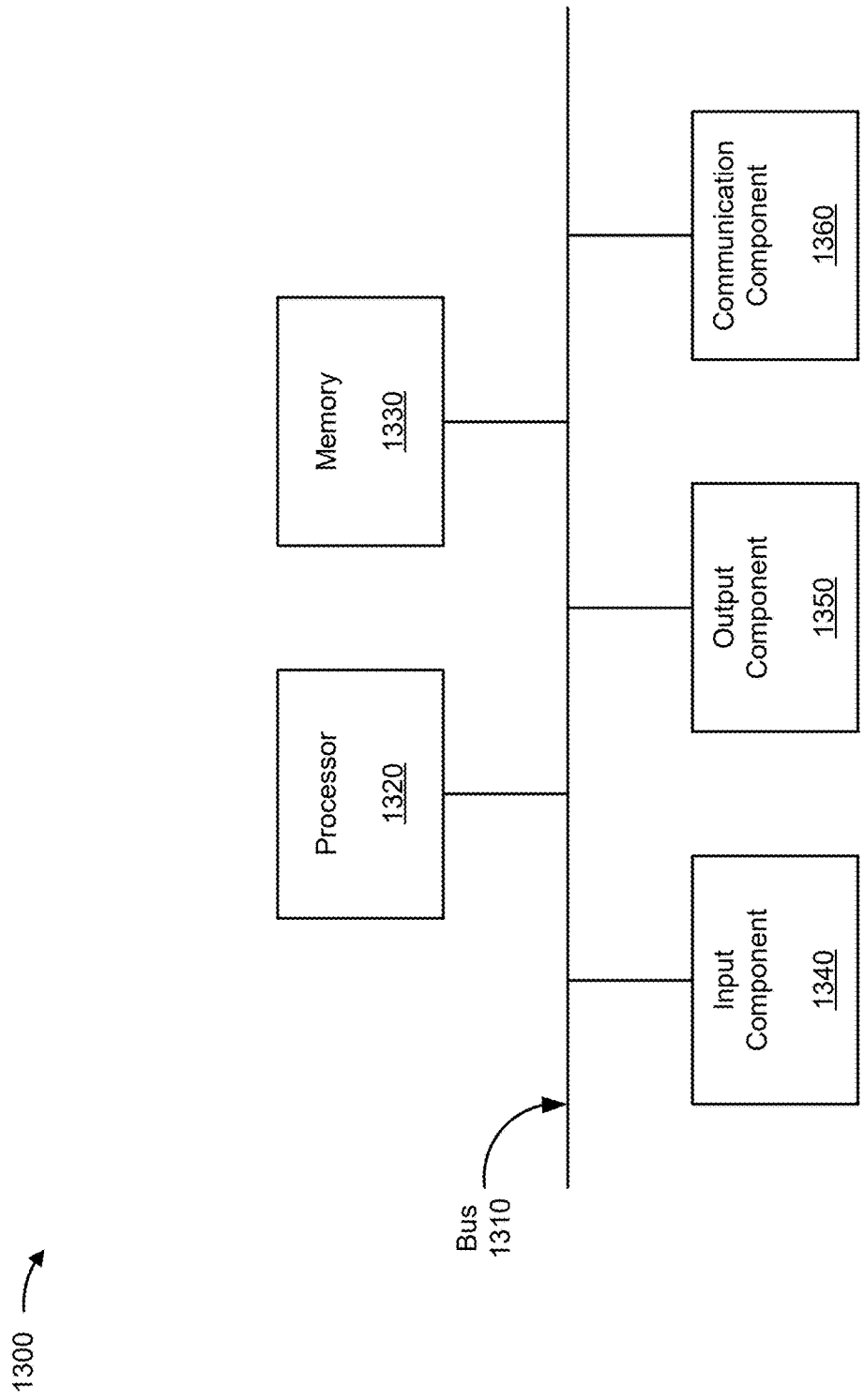
FIG. 13 is a diagram of example components of one or more devices of FIG. 12.

FIG. 13 is a diagram of example components of a device 1300 associated with device location reporting. The device 1300 may correspond to a network device (e.g., a network device associated with IoT platform 1108). In some implementations, the network device may include one or more devices 1300 and/or one or more components of the device 1300. As shown in FIG. 13, the device 1300 may include a bus 1310, a processor 1320, a memory 1330, an input component 1340, an output component 1350, and/or a communication component 1360.

The bus 1310 may include one or more components that enable wired and/or wireless communication among the components of the device 1300. The bus 1310 may couple together two or more components of FIG. 13, such as via operative coupling, communicative coupling, electronic coupling, and/or electric coupling. For example, the bus 1310 may include an electrical connection (e.g., a wire, a trace, and/or a lead) and/or a wireless bus. The processor 1320 may include a central processing unit, a graphics processing unit, a microprocessor, a controller, a microcontroller, a digital signal processor, a field-programmable gate array, an application-specific integrated circuit, and/or another type of processing component. The processor 1320 may be implemented in hardware, firmware, or a combination of hardware and software. In some implementations, the processor 1320 may include one or more processors capable of being programmed to perform one or more operations or processes described elsewhere herein.

The memory 1330 may include volatile and/or nonvolatile memory. For example, the memory 1330 may include random access memory (RAM), read only memory (ROM), a hard disk drive, and/or another type of memory (e.g., a flash memory, a magnetic memory, and/or an optical memory). The memory 1330 may include internal memory (e.g., RAM, ROM, or a hard disk drive) and/or removable memory (e.g., removable via a universal serial bus connection). The memory 1330 may be a non-transitory computer-readable medium. The memory 1330 may store information, one or more instructions, and/or software (e.g., one or more software applications) related to the operation of the device 1300. In some implementations, the memory 1330 may include one or more memories that are coupled (e.g., communicatively coupled) to one or more processors (e.g., processor 1320), such as via the bus 1310. Communicative coupling between a processor 1320 and a memory 1330 may enable the processor 1320 to read and/or process information stored in the memory 1330 and/or to store information in the memory 1330.

The input component 1340 may enable the device 1300 to receive input, such as user input and/or sensed input. For example, the input component 1340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 1350 may enable the device 1300 to provide output, such as via a display, a speaker, and/or a light-emitting diode. The communication component 1360 may enable the device 1300 to communicate with other devices via a wired connection and/or a wireless connection. For example, the communication component 1360 may include a receiver, a transmitter, a transceiver, a modem, a network interface card, and/or an antenna.

The device 1300 may perform one or more operations or processes described herein. For example, a non-transitory computer-readable medium (e.g., memory 1330) may store a set of instructions (e.g., one or more instructions or code) for execution by the processor 1320. The processor 1320 may execute the set of instructions to perform one or more operations or processes described herein. In some implementations, execution of the set of instructions, by one or more processors 1320, causes the one or more processors 1320 and/or the device 1300 to perform one or more operations or processes described herein. In some implementations, hardwired circuitry may be used instead of or in combination with the instructions to perform one or more operations or processes described herein. Additionally, or alternatively, the processor 1320 may be configured to perform one or more operations or processes described herein. Thus, implementations described herein are not limited to any specific combination of hardware circuitry and software.

The number and arrangement of components shown in FIG. 13 are provided as an example. The device 1300 may include additional components, fewer components, different components, or differently arranged components than those shown in FIG. 13. Additionally, or alternatively, a set of components (e.g., one or more components) of the device 1300 may perform one or more functions described as being performed by another set of components of the device 1300.

Figure 14:
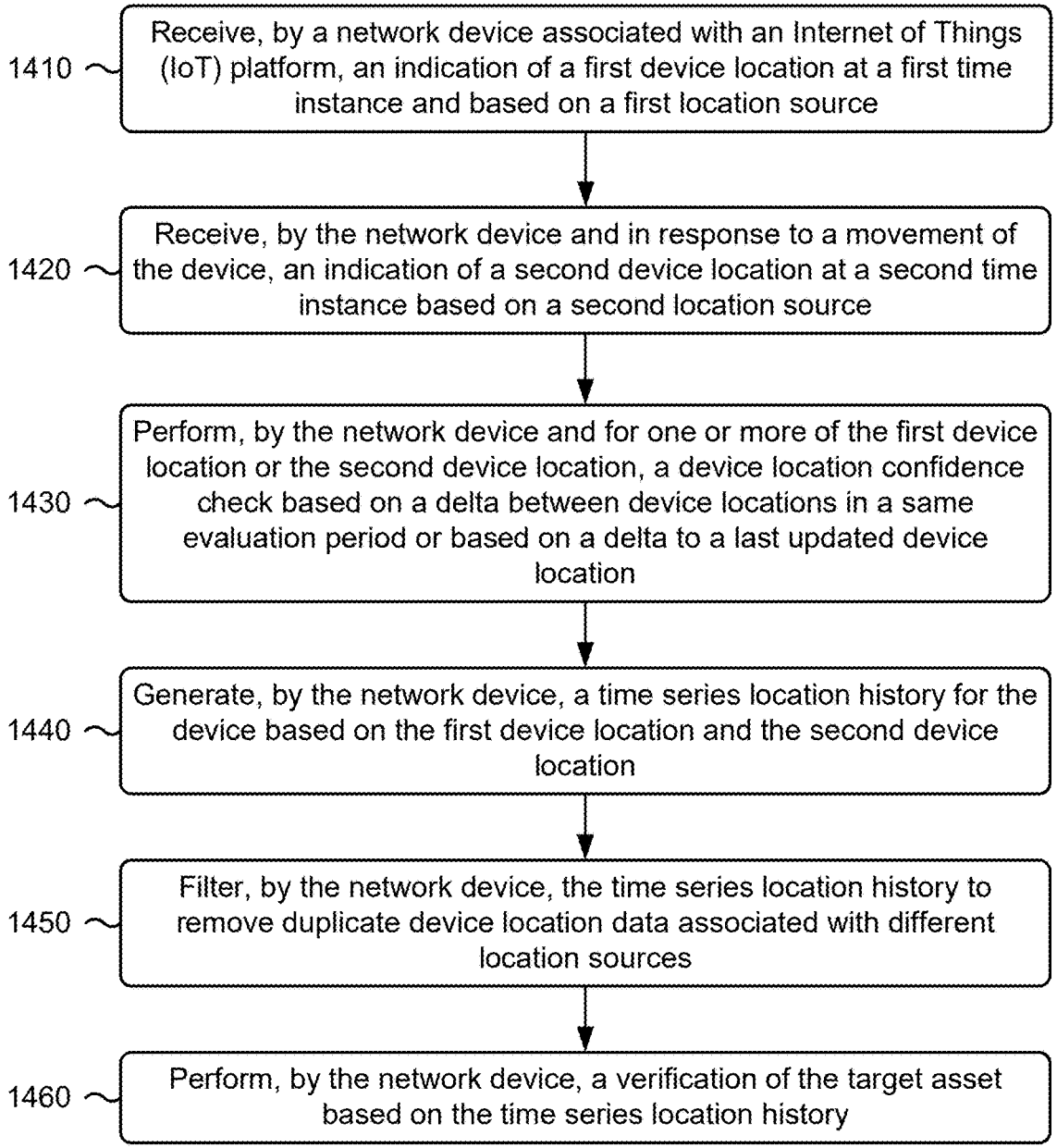
FIG. 14 is a flowchart of an example process associated with device location reporting.

FIG. 14 is a flowchart of an example process 1400 associated with device location reporting. In some implementations, one or more process blocks of FIG. 14 may be performed by a network device (e.g., a network device associated with IoT platform 1108). In some implementations, one or more process blocks of FIG. 14 may be performed by another device or a group of devices separate from or including the network device (e.g., device 1202, mobile gateway 1204, or static gateway 1206). Additionally, or alternatively, one or more process blocks of FIG. 14 may be performed by one or more components of device 1300, such as processor 1320, memory 1330, input component 1340, output component 1350, and/or communication component 1360.

As shown in FIG. 14, process 1400 may include receiving, by a network device associated with an IoT platform, an indication of a first device location at a first time instance and based on a first location source, wherein the first device location is a first location of a device associated with a target asset (block 1410). The device may be a BLE tag. The target asset may be an object in a factory. The first device location at the first time instance may be based on the first location source being a static BLE gateway. In some implementations, each indication of device location may be associated with a device identifier, a gateway device identifier, a source location technology that generates a location sample point, an accuracy range associated with the source location technology, and/or a timestamp.

As shown in FIG. 14, process 1400 may include receiving, by the network device and in response to a movement of the device, an indication of a second device location at a second time instance based on a second location source, wherein the second device location is a second location of the device, and a geofence alarm is triggered to set up location measurements associated with the second location source based on the movement of the device (block 1420). The second device location at the second time instance may be based on the second location source being a mobile BLE gateway location. The device may not be statically paired to the first location source or the second location source, and the device may be enabled to physically transition between coverage of supported location technologies.

As shown in FIG. 14, process 1400 may include performing, by the network device and for one or more of the first device location or the second device location, a device location confidence check based on a delta between device locations in a same evaluation period or based on a delta to a last updated device location (block 1430). For example, the network node may indicate whether device locations are associated with low confidence, fair confidence, or high confidence, where the device location confidence check may include a location spoof check, which may occur when device locations are outside of an accuracy range by a defined threshold.

As shown in FIG. 14, process 1400 may include generating, by the network device, a time series location history for the device based on the first device location and the second device location (block 1440). The network device may generate the time series location history for a mixed indoor-outdoor tracking of the device. The network device may combine and sequence location data into one single time series per device. In some implementations, the network device may monitor multiple location data source streams. The network device may select a particular location technology to use as a primary location information. The network device may determine whether a different location technology is to be activate to provide the primary location information for the device.

As shown in FIG. 14, process 1400 may include filtering, by the network device, the time series location history to remove duplicate device location data associated with different location sources (block 1450). The network device may suspend duplicate location reporting information associated with the device. The network node may throttle a location data generation rate per location technology.

As shown in FIG. 14, process 1400 may include performing, by the network device, a verification of the target asset based on the time series location history (block 1460). The network device may be able to provide a location of a tagged asset throughout a lifecycle of the asset, especially for the mixed indoor/outdoor tracking use case. For example, the network device may be able to verify that the asset successfully traveling from a warehouse to a delivery truck. The network device may provide continuous location tracking per asset with automated location service management in an IoT cloud platform.

Although FIG. 14 shows example blocks of process 1400, in some implementations, process 1400 may include additional blocks, fewer blocks, different blocks, or differently arranged blocks than those depicted in FIG. 14. Additionally, or alternatively, two or more of the blocks of process 1400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is Intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a network device associated with an Internet of Things (IoT) platform, an indication of a first device location at a first time instance and based on a first location source, wherein the first device location is a first location of a device associated with a target asset;
receiving, by the network device and in response to a movement of the device, an indication of a second device location at a second time instance based on a second location source, wherein the second device location is a second location of the device, and a geofence alarm is triggered to set up location measurements associated with the second location source based on the movement of the device;
performing, by the network device and for one or more of the first device location or the second device location, a device location confidence check based on a delta between device locations in a same evaluation period or based on a delta to a last updated device location;
generating, by the network device, a time series location history for the device based on the first device location and the second device location;
filtering, by the network device, the time series location history to remove duplicate device location data associated with different location sources; and
performing, by the network device, a verification of the target asset based on the time series location history.

2. The method of claim 1, wherein the device is a wireless communication device operating a standard defined wireless protocol.

3. The method of claim 1, wherein the first device location at the first time instance is based on the first location source being a physical device that is statically fixed to a location and operating as a wireless signal gateway.

4. The method of claim 1, wherein the second device location at the second time instance is based on the second location source being a mobile device operating as a wireless signal gateway.

5. The method of claim 1, further comprising:
generating, by the network device, the time series location history for a mixed indoor-outdoor tracking of the device.

6. The method of claim 1, wherein the device is not statically paired to the first location source or the second location source, and the device is enabled to physically transition between coverage of supported location technologies.

7. The method of claim 1, wherein each indication of device location is associated with one or more of: a device identifier, a gateway device identifier, a source location technology that generates a location sample point, an accuracy range associated with the source location technology, or a timestamp.

8. The method of claim 1, further comprising:
collecting, by the network device, for the device during a registration or an activation of the device on the IoT platform or based on an updated device configuration, information regarding one or more of: a device identifier, a location reporting type, a location reporting period, a reporting delay due to buffering for processing, or a maximum location update window.

9. The method of claim 1, further comprising:
receiving, by the network device, an indication of an event, wherein the event is set based on the device entering a location technology switch zone due to the movement of the device; and
reconfiguring, by the network device, an active location technology for the device based on the geofence alarm being triggered due to an occurrence of the event, wherein a selection of a location technology data stream for the device is based on a user profile.

10. The method of claim 1, further comprising:
suspending, by the network device, duplicate location reporting information associated with the device; or
throttling, by the network device, a location data generation rate per location technology.

11. The method of claim 1, further comprising:
monitoring multiple location data source streams;
selecting a particular location technology to use as a primary location information; and
determining whether a different location technology is to be activate to provide the primary location information for the device.

12. A network device, comprising:
one or more processors configured to:
receive an indication of a first device location at a first time instance and based on a first location source, wherein the first device location is a first location of a device associated with a target asset;
receive, in response to a movement of the device, an indication of a second device location at a second time instance based on a second location source, wherein the second device location is a second location of the device, and a geofence alarm is triggered to set up location measurements associated with the second location source based on the movement of the device;
perform, for one or more of the first device location or the second device location, a device location confidence check based on a delta between device locations in a same evaluation period or based on a delta to a last updated device location;
generate a time series location history for the device based on the first device location and the second device location; and
filter the time series location history to remove duplicate device location data associated with different location sources;
perform a verification of the target asset based on the time series location history.

13. The network device of claim 12, wherein:
the first device location at the first time instance is based on the first location source being a physical device that is statically fixed to a location and operating as a wireless signal gateway; and
the second device location at the second time instance is based on the second location source being a mobile device operating as a wireless signal gateway.

14. The network device of claim 12, wherein:
the device is not statically paired to the first location source or the second location source, and the device is enabled to physically transition between coverage of supported location technologies; and
each indication of device location is associated with one or more of: a device identifier, a gateway device identifier, a source location technology that generates a location sample point, an accuracy range associated with the source location technology, or a timestamp.

15. The network device of claim 12, wherein the one or more processors are further configured to:
- collect, for the device during a registration or an activation of the device on an Internet of Things (IoT) platform or based on an updated device configuration, information regarding one or more of: a device identifier, a location reporting type, a location reporting period, a reporting delay due to buffering for processing, or a maximum location update window.

16. The network device of claim 12, wherein the one or more processors are further configured to:
- receive an indication of an event, wherein the event is set based on the device entering a location technology switch zone due to the movement of the device; and
- reconfigure an active location technology for the device based on the geofence alarm being triggered due to an occurrence of the event, wherein a selection of a location technology data stream for the device is based on a user profile.

17. The network device of claim 12, wherein the one or more processors are further configured to:
- suspend duplicate location reporting information associated with the device; or
- throttle a location data generation rate per location technology.

18. The network device of claim 12, wherein the device is a wireless communication device operating a standard defined wireless protocol, the network device is associated with an Internet of Things (IoT) platform, and the time series location history is associated with a mixed indoor-outdoor tracking of the device.

19. The network device of claim 12, wherein the one or more processors are further configured to:
- monitor multiple location data source streams;
- select a particular location technology to use as a primary location information; and
- determine whether a different location technology is to be activate to provide the primary location information for the device.

20. A non-transitory computer-readable medium storing a set of instructions, the set of instructions comprising:
- one or more instructions that, when executed by one or more processors of a network device, cause the network device to:
  - receive an indication of a first device location at a first time instance and based on a first location source, wherein the first device location is a first location of a device associated with a target asset;
  - receive, in response to a movement of the device, an indication of a second device location at a second time instance based on a second location source, wherein the second device location is a second location of the device, and a geofence alarm is triggered to set up location measurements associated with the second location source based on the movement of the device;
  - perform, for one or more of the first device location or the second device location, a device location confidence check based on a delta between device locations in a same evaluation period or based on a delta to a last updated device location;
  - generate a time series location history for the device based on the first device location and the second device location;
  - filter the time series location history to remove duplicate device location data associated with different location sources; and
  - perform a verification of the target asset based on the time series location history.

* * * * *